United States Patent [19]
Visser

[11] Patent Number: 5,567,308
[45] Date of Patent: Oct. 22, 1996

[54] POINT-OF-USE WATER FILTRATION AND DISPENSING UNIT

[75] Inventor: Timon J. Visser, Hamilton, Australia

[73] Assignee: Visshill-Tech (Patents) Pty. Limited, Wickham, Australia

[21] Appl. No.: 211,028

[22] PCT Filed: Sep. 17, 1992

[86] PCT No.: PCT/AU92/00488

§ 371 Date: Mar. 17, 1994

§ 102(e) Date: Mar. 17, 1994

[87] PCT Pub. No.: WO93/05861

PCT Pub. Date: Apr. 1, 1993

[30] Foreign Application Priority Data

Sep. 17, 1991 [AU] Australia .................. PK8405

[51] Int. Cl.$^6$ .................................. B01D 35/30
[52] U.S. Cl. .................. 210/232; 210/266; 210/282; 210/474; 210/477; 210/489
[58] Field of Search .................. 222/189; 210/232, 210/244, 266, 282, 464, 469, 474, 477, 482, 489

[56] References Cited

U.S. PATENT DOCUMENTS

| | | |
|---|---|---|
| 1,547,105 | 7/1925 | Dunbar . |
| 1,547,855 | 7/1925 | Burson . |
| 1,551,572 | 9/1925 | Kneuper . |
| 1,606,693 | 11/1926 | Bucquet . |
| 1,621,684 | 3/1927 | Rabjohn et al. . |
| 1,629,269 | 5/1927 | Hagg . |
| 1,645,712 | 10/1927 | Meyers . |
| 1,674,203 | 6/1928 | Holz et al. . |
| 1,752,060 | 3/1930 | Burright et al. . |
| 4,491,520 | 1/1985 | Jaye ............................ 210/232 |
| 4,764,274 | 8/1988 | Miller .......................... 210/282 |
| 4,995,975 | 2/1991 | Jacquot et al. ............... 210/266 |
| 5,085,903 | 2/1992 | Kapp et al. . |

FOREIGN PATENT DOCUMENTS

57724/90 1/1991 Australia .

*Primary Examiner*—W. L. Walker
*Attorney, Agent, or Firm*—Beveridge, DeGrandi, Weilacher & Young

[57] ABSTRACT

A point-of-use water filtration and dispensing unit including an unfiltered water storage container removably supported above a filtered water reservoir. The container has an inlet for unfiltered water and an outlet communicating with the reservoir, with the water in the container being exposed to atmospheric pressure. The filtered water reservoir communicates with a dispensing outlet having tap means which in its closed position resists the hydrostatic pressure of the water in the reservoir and the container. A seal removably seals the reservoir to the container, and a filter is removably located within the unfiltered water container such that water flows through said filter by gravity feed as filtered water is dispensed from the reservoir.

13 Claims, 1 Drawing Sheet

POINT-OF-USE WATER FILTRATION AND DISPENSING UNIT

TECHNICAL FIELD

The present invention relates to a point-of-use water filtration unit for purifying drinking water, and in particular to adaption of a conventional purified water dispenser unit to point-of-use filtration.

BACKGROUND ART

Conventional purified water dispenser units for use in homes or offices include a refrigerated bowl and a support for holding a bottle of purified water in an inverted position with its neck extending into the bowl. Water from the bottle fills the bowl to the level of the bottle neck at which stage the vacuum formed at the top of the bottle prevents further water flowing into the bowl. Where it is desired to provide both hot and cold water from a single dispenser unit, the bowl may be separated into upper and lower reservoirs by a horizontal plate, with the unrefrigerated water from the upper reservoir passing through a water heater before discharge from a separate hot water tap. When water is withdrawn from the bowl, the water level drops below the neck of the bottle and air enters the bottle. This relieves the vacuum in the top of the bottle and water flows into the bowl until the level again reaches the neck.

Water dispensers of this type require the purchase of bottles of purified water, which can be quite expensive and may be unavailable in remote areas. Furthermore, as the water in the bottle has been purified, all chlorine or other disinfecting agents have been removed and the water is unprotected against the growth of bacteria introduced by contaminated air bubbling through the water in the bottle.

Further disadvantages of the conventional purified water dispensers are the necessity of lifting and inverting full bottles of purified water onto the unit, and storage of both full and empty bottles. The storage of empty bottles creates a risk of contamination of the bottles, which are difficult to clean thoroughly through the small neck opening.

These disadvantages may be overcome by point-of-use filtration, in which tap water is purified shortly before use, thus retaining the chlorine in the water for as long as possible to minimise the likelihood of contamination. point-of-use filtration systems normally consist of a filter connected to the cold water plumbing, with a separate dispensing outlet connected to the filter outlet.

Australian Patent Application No. 57724/90 in the name of M. F. A. Robertson describes a point-of-use filtration unit for mounting on a conventional water dispenser unit. The unit comprises a filter which sits in and seals against the bowl and a container sitting above the filter with its neck inserted in the filter inlet. The container is filled with tap water through a lid at its top end. The water leaves the container through the neck, and is purified as it follows a tortuous path through the filtration medium and enters the bowl.

In the filtration unit of Patent Application No. 57724/90, the filter takes up a substantial volume of the bowl and thus reduces the volume of purified water held. This is particularly disadvantageous in units in which the bowl is separated into hot and cold water reservoirs.

DISCLOSURE OF INVENTION

The present invention aims to overcome at least some of the disadvantages of the prior art, and is characterised by providing a filter inside the unfiltered water container.

In one form, the present invention provides a point-of-use water filtration and dispensing unit, comprising an unfiltered water storage container removably supported above a filtered water reservoir, the container having an inlet for unfiltered water and an outlet communicating with the reservoir, the water in the container being exposed to atmospheric pressure, the filtered water reservoir communicating with a dispensing outlet having tap means which in its closed position resists the hydrostatic pressure of the water in the reservoir and the container, a seal removably sealing the reservoir to the container, and a filter removably located within the unfiltered water container such that water flows through said filter by gravity feed as filtered water is dispensed from the reservoir.

Preferably, the unfiltered water container is an inverted bottle and the filter is supported within the water bottle by a filter carrier which engages with, and more preferably plugs inside, the neck of the bottle.

The filtered water reservoir is preferably an open-topped bowl, with the seal comprising a sealing member which seals against the inner wall of the bowl.

BRIEF DESCRIPTION OF DRAWINGS

Further preferred embodiments of the invention shall now be described with reference to the accompanying drawings, in which:

FIG. 1 shows the upper portion of a conventional water dispenser unit which has been converted for point-of-use filtration. The unit has an open-topped reservoir bowl 11 surrounded by cooling coils 12, with an outlet 13 leading to a tap 14 for dispensing filtered water. The unit also has supports 15 for holding a water bottle 16 in an inverted position above the bowl.

Figure 1:
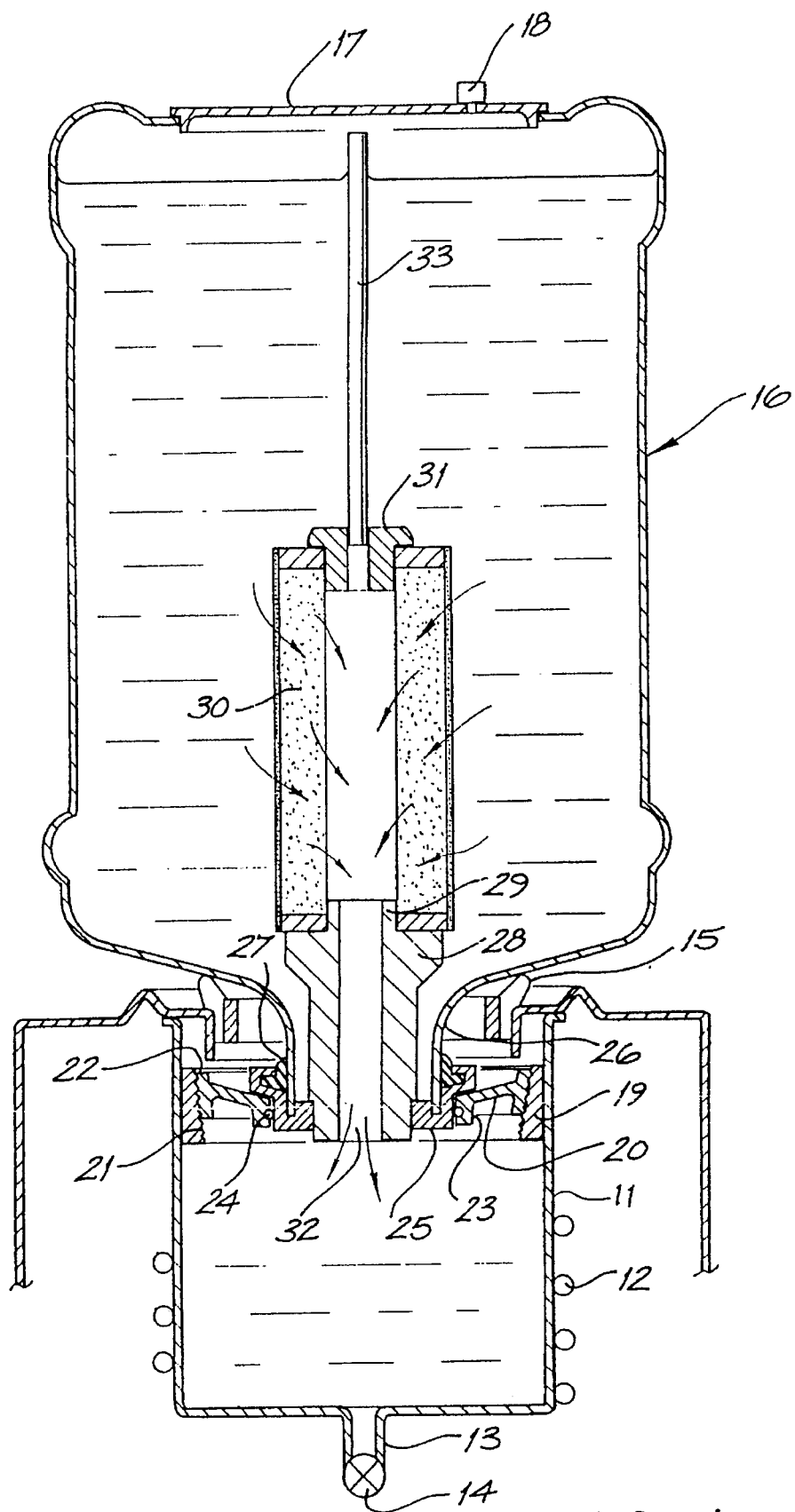
FIG. 1 is a schematic cross sectional view of part of the preferred water filtration unit according to the invention.

The illustrated bottle is of the type typically used with conventional purified water dispensers, except that a circular hole has been cut in the base of the bottle and a removable lid 17 is fitted in the hole. The lid should allow the ingress of air into the container to displace the water which passes through the filter when filtered water is dispensed. For example, the lid may be fitted with a filtered air vent 18. The bottle is preferably substantially transparent for aesthetic appeal and to allow easy checking of the water level, and is dyed or coated with a U.V. protective substance to substantially reduce or eliminate ultraviolet light incident on the tap water in the bottle. For example, a coating preventing 98% of ultraviolet light may be applied. This prevents breakdown of the chlorine by the ultraviolet light, thus ensuring that the relatively large volume of water in the bottle is protected from bacteria and that only the relatively small volume of filtered water ready for use is unprotected.

The seal assembly consists of an annular, elastomeric sealing member 19 having an outer diameter slightly smaller than the internal diameter of the bowl 11, and an expansion member 20. The annular seal member has an internal, frustroconical thread 21, with the expansion member having a corresponding external thread 22. To fit the seal, the sealing member 19 is inserted in the top portion of the bowl and the expansion member 20 is screwed in. The engagement of the frustroconical thread causes the expansion member to urge the seal member outwardly against the inner wall of the bowl.

Scaling members 19 of several different outside diameters may be supplied, all for use with a single type of expansion member, thus allowing fitting to various types of dispenser units for conversion to point-of-use units according to the invention.

The expansion member has a central, cylindrical socket 23 with an O-ring 24 for sealing against a spigot 25 fitted on the neck 26 of the bottle. The spigot 25 is sealed on the neck by means of a bead of sealant material 27, which is applied to the neck before the spigot is pushed onto the neck.

The lower portion of the spigot 25 extends inwardly of the neck and has a central bore.

Disposed within the neck is a filter carrier 28, the lower portion of which plugs into and seals against the spigot 25. The top of the filter carrier has an upper spigot 29 for plugging into the base of a cylindrical filter 30 having a suitable filtration medium. A plug 31 inserted in the top of the filter prevents water bypassing the filter.

The filter carrier is spaced from the inside wall of the bottle neck. This creates a gap into which any sediment from the tap water may settle, thus prolonging filter life as the filter is not required to remove the sediment. Due to the shape of the filter carrier, this zone is substantially quiescent during operation of the unit so that the sediment is not stirred up.

The diameter of the bore 32 through the filter carrier dictates the rate at which water flows from the container to replenish the water in the reservoir. This in turn directly controls the contact time of the water passing through the filter. In circumstances where the feed water supply has particularly high levels of chlorine or other impurities, or where highly purified water is desired, a filter carrier with a smaller bore diameter can be fitted in order to increase the contact time between the water and the filtration medium.

A breather tube 33 extends from the top of the filter to the air space above the water in the bottle, or to a vented lid of the bottle, to allow air in the bowl to escape during initial filling of the unit.

A particularly advantageous filter construction is an annular core of activated carbon surrounded by a prefilter, such as windings of a polyethylene yarn. In addition to the normal action of the prefilter in removing some contaminants, it has been found that the prefilter provides a buffer zone between the activated carbon and the body of water in the bottle, thus substantially preventing the carbon from removing the chlorine in the bottle before the water passes through the filter to the reservoir.

In use, the seal assembly is inserted in the bowl and tightened as described above, and the spigot of inverted bottle is plugged into socket 23 of the expansion member 20. The filter carrier 28, filter 30, plug 31 and breather tube 33 arrangement is plugged then into the upper spigot 25 of the bottle. Lid 17 is removed and tap water is then poured into the bottle. The tap water then percolates through the filter under gravity and the resultant filtered water passes through the hollow body of filter carrier 28 into the bowl 11 of the water cooler. The air displaced by the filtered water escapes through the breather tube 33. The use of gravity filtration minimises short circuiting through paths of least resistance in the filter, which occurs when the water is forced through the filter when under pressure. When filtered water is withdrawn from the bowl for use, more tap water percolates through the filter to replace it.

By placing the filter within the bottle, the amount of filtered water within the unit is increased by the column of filtered water within the filter carrier and a sediment trap is formed to extend the life of the filter. The increased filtered water capacity allows better purification, as a finer filter material with lower flow rate can be used. Furthermore, this construction allows the use of an inexpensive filter carrier and a conventional cylindrical filter designed for radially inward water flow. The construction also facilitates replacement of the filter when the life of the filtration medium expires.

I claim:

1. A point-of-use water filtration and dispensing unit, comprising an unfiltered water container removably supported above a filtered water reservoir, the container having an inlet for in situ addition of unfiltered water to the container and an outlet communicating with the reservoir, the filtered water reservoir communicating with a dispensing outlet having tap means, a seal removably sealed to the reservoir and adapted for sealing connection of the container to the reservoir, and a filter removably located in the container, the unfiltered water in the container being exposed to atmospheric pressure and held at a level above the reservoir by the tap means and the seal, the water flowing through said filter by gravity feed and entering the reservoir to replace filtered water which is dispensed from the reservoir, the seal comprising an outer sealing member which seals against an inner wall of the reservoir and an expansion member for urging the outer sealing member against the inner wall of the reservoir.

2. A filtration and dispensing unit according to claim 1 wherein the expansion member urges the sealing member outwardly by means of corresponding frustroconical threads on the sealing member and the expansion member.

3. A point-of-use water filtration and dispensing unit, comprising an unfiltered water container removably supported above a filtered water reservoir, the container having an inlet for in situ addition of unfiltered water to the container and an outlet communicating with the reservoir, the filtered water reservoir communicating with a dispensing outlet having tap means, a seal removably sealed to the reservoir and adapted for sealing connection of the container to the reservoir, and a filter removably located within the container, the unfiltered water in the container being exposed to atmospheric pressure and held at a level above the reservoir by the tap means and the seal, the water flowing through said filter by gravity feed and entering the reservoir to replace filtered water which is dispensed from the reservoir, the seal comprising an outer sealing member which seals against the reservoir, wherein the container outlet comprises a spigot which is received in a socket of the seal.

4. A filtration and dispensing unit according to claim 3, wherein said spigot extends through the socket into the reservoir.

5. A point-of-use water filtration and dispensing unit, comprising an unfiltered water storage bottle removably supported above a filtered water reservoir bowl having a wide open top, the bottle having an inlet for in situ addition of unfiltered water to the bottle and a downwardly extending neck which serves as an outlet communicating with the reservoir, the filtered water reservoir communicating with a dispensing outlet having tap means, a seal removably sealed to the reservoir so as to convert the reservoir for removable sealing connection of the bottle to the reservoir, and a filter removably located within the bottle, said filter being connected to the neck of the bottle, the unfiltered water in the bottle being exposed to atmospheric pressure and held at a level above the reservoir by the tap means and the seal, the water flowing through said filter by gravity feed and entering the reservoir to replace filtered water which is dispensed from the reservoir, wherein the filter is removably fitted to a filter carrier received at least partly within the neck of the bottle.

6. A filtration and dispensing unit according to claim 5 wherein the filter carrier plugs into engagement with the neck.

7. A filtration and dispensing unit according to claim 5 wherein a gap between the filter carrier and the neck forms a sediment trap below the level of the filter.

8. A filtration and dispensing unit according to claim 5, wherein the filter is substantially annular with an internal bore which communicates with the neck outlet through a bore in the filter carrier.

9. A point-of-use water filtration and dispensing unit, comprising an unfiltered water bottle removably supported above a filtered water reservoir, the bottle having an inlet for in situ addition of unfiltered water to the bottle and a downwardly extending neck which serves as an outlet communicating with the reservoir, the filtered water reservoir communicating with a dispensing outlet having tap means, a seal removably sealed to the reservoir and adapted for sealing connection of the bottle to the reservoir, and a filter removably located within the bottle, the unfiltered water in the bottle being exposed to atmospheric pressure and held at a level above the reservoir by the tap means and the seal, the water flowing through said filter by gravity feed and entering the reservoir to replace filtered water which is dispensed from the reservoir, wherein the filter is supported by a filter carrier received at least partly within the neck of the bottle, the filter being substantially annular with an internal bore which communicates with the bottle outlet through a bore in the filter carrier, and wherein the filter plugs onto an upper spigot of the filter carrier.

10. A point-of-use water filtration and dispensing unit, comprising an unfiltered water bottle removably supported above a filtered water reservoir bowl having a wide open top, the bottle having an inlet for in situ addition of unfiltered water to the bottle and an outlet communicating with the reservoir, the filtered water reservoir communicating with a dispensing outlet having tap means, a seal removably sealed to the reservoir so as to convert the reservoir for removable sealing connection of the bottle to the reservoir, and a filter removably located within the bottle, the unfiltered water in the bottle being exposed to atmospheric pressure and held at a level above the reservoir by the tap means and the seal, the water flowing through said filter by gravity feed and entering the reservoir to replace filtered water which is dispensed from the reservoir, wherein the seal comprises an outer sealing member which seals against the reservoir, an inner seal means for the sealing connection of the bottle, and annular spacing means between the outer sealing member and inner seal means.

11. A point-of-use water filtration and dispensing unit according to claim 10 wherein the bottle plugs into engagement with the seal.

12. A point-of-use water filtration and dispensing unit according to claim 11 wherein the outer sealing member seals against an inner wall of the reservoir.

13. A point-of-use water filtration and dispensing unit, comprising an unfiltered water bottle removably supported above a filtered water reservoir, the bottle having an inlet for in situ addition of unfiltered water to the bottle and a downwardly extending neck which serves as an outlet communicating with the reservoir, the filtered water reservoir communicating with a dispensing outlet having tap means, a seal removably sealed to the reservoir and adapted for sealing connection of the bottle to the reservoir, and a filter removably located within the bottle, the unfiltered water in the bottle being exposed to atmospheric pressure and held at a level above the reservoir by the tap means and the seal, the water flowing through said filter by gravity feed and entering the reservoir to replace filtered water which is dispensed from the reservoir, wherein the filter is supported by a filter carrier received at least partly within the neck of the bottle, the filter being substantially annular with an internal bore which communicates with the bottle outlet through a bore in the filter carrier, and wherein the filter plugs into engagement with the filter carrier, said plug covering the top of the annular bore to prevent bypassing of the filter, and a breather tube carried by said plug.

* * * * *